Dec. 24, 1968  R. D. BECK ET AL  3,417,663
PNEUMATIC PROGRAMMING MEANS AND THE LIKE
Filed March 4, 1965  4 Sheets-Sheet 4

INVENTORS
ROLAND D. BECK
HAROLD W. RICE
BY
Caudor & Caudor
THEIR ATTORNEYS

United States Patent Office 3,417,663
Patented Dec. 24, 1968

3,417,663
PNEUMATIC PROGRAMMING MEANS
AND THE LIKE
Roland D. Beck, Anaheim, and Harold W. Rice, Fullerton, Calif., assignors to Robertshaw Controls Company, Richmond, Va., a corporation of Delaware
Filed Mar. 4, 1965, Ser. No. 437,169
6 Claims. (Cl. 91—36)

ABSTRACT OF THE DISCLOSURE

This disclosure relates to a program member that is rotated relative to a reading head to fluidly interconnect together various ports interrupting the reading surface of the reading head by a timer motor and that is rapidly rotated relative to the reading head by a pair of pneumatically operated actuators to override the timer motor with such overriding actuators being controlled by the program member itself, the disclosure also relating to a selector valve being mounted on the same plate that forms the reading head and to various shapes and combinations of channel means formed in the program member for interconnecting various ports of the reading head together.

---

This invention relates to an improved pneumatic programming means wherein a system for an appliance or the like can be pneumatically controlled.

In particular, this invention provides a programming means which is a small compact unit while still providing a large number of system functions or operations in a manner heretofore unattainable in the prior art.

For example, one feature of this invention is to provide pneumatic steppers for rapidly advancing a main program member in a direction overriding the conventional timer motor therefor to simply and effectively eliminate portions of the program of the program member as selected. The stepping unit is relatively small in size and can utilize essentially the same space as the timer motor whereby the programming means of this invention is kept relatively small.

Another feature of this invention is to provide a selector valve arrangement for selecting the desired program of the main program member with the selector valve utilizing the same program plate as the main program member.

Another feature of this invention is to optimize blister shapes and combinations in the main program member to reduce the size requirements of the program member and, hence, the programming means itself.

Another feature of this invention is to provide means for mounting the various pneumatically operated switch actuators on the program plate itself to reduce the size of the switch assembly for the appliance or the like.

Accordingly, it is an object of this invention to provide an improved programming means having one or more of the novel features set forth above or hereinafter shown or described.

Other objects, uses and advantages of this invention are apparent from a reading of this description, which proceeds with reference to the accompanying drawings forming a part thereof and wherein.

Figure 1:
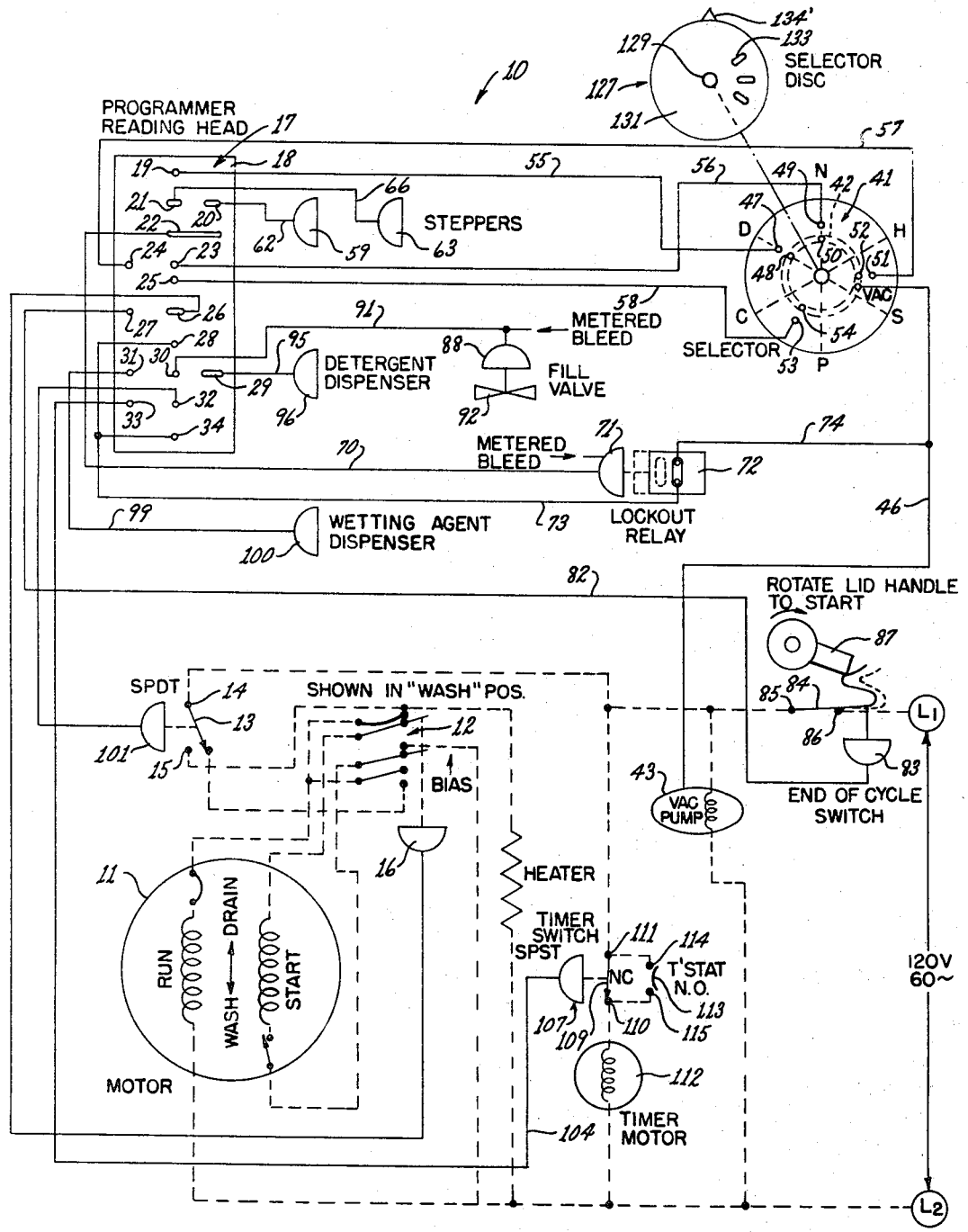
FIGURE 1 is a schematic diagram illustrating the improved system of this invention.

While the various features of this invention are hereinafter described and illustrated as being particularly adaptable to provide a miniature programming means for a dishwasher or the like, it is to be understood that the various features of this invention can be used singly or in any combination thereof to provide programming means for other devices as desired.

Therefore, this invention is not to be limited to only the embodiments illustrated in the drawings, because the drawings are merely utilized to illustrate one of the wide variety of uses of this invention.

Referring now to FIGURE 1, an improved system for controlling the operation of a domestic dishwasher is generally indicated by the reference numeral 10 and will now be described.

The system 10 includes a conventional electrical motor 11 adapted to be placed across leads $L_1$ and $L_2$ in a manner hereinafter described so that when the electrical switch means 12 is disposed in the position illustrated in FIGURE 1 and a movable switch blade 13 bridges contacts 14 and 15, the motor 11 will operate the impeller of the dishwasher. However, when the switch structure 12 has the switch blades thereof pulled downwardly upon the evacuation of a vacuum operated actuator 16 and the switch blade 13 is disposed in the position illustrated in full lines in FIGURE 1, the motor 11 operates a drain pump in the dishwasher for a purpose hereinafter described.

A reading head 17 is schematically illustrated in FIGURE 1 and has the reading surface 18 thereof interrupted by a plurality of ports 19, 20, 21, 22, 23, 24, 25, 26, 27, 28, 29, 30, 31, 32, 33 and 34 for a purpose hereinafter described. The ports 19, 21, 22, 23, 25, 26, 28, 30, 32 and 34 are disposed in vertical alignment while the port 20 is disposed in horizontal alignment with the vertically aligned port 21, the port 24 being horizontally aligned with the vertically aligned port 23, the port 27 being horizontally aligned with the vertically aligned port 26, the ports 29 and 31 being horizontally aligned with the vertically aligned port 30 and the port 33 being horizontally aligned with vertically aligned port 32 for a purpose hereinafter described.

Figure 3:
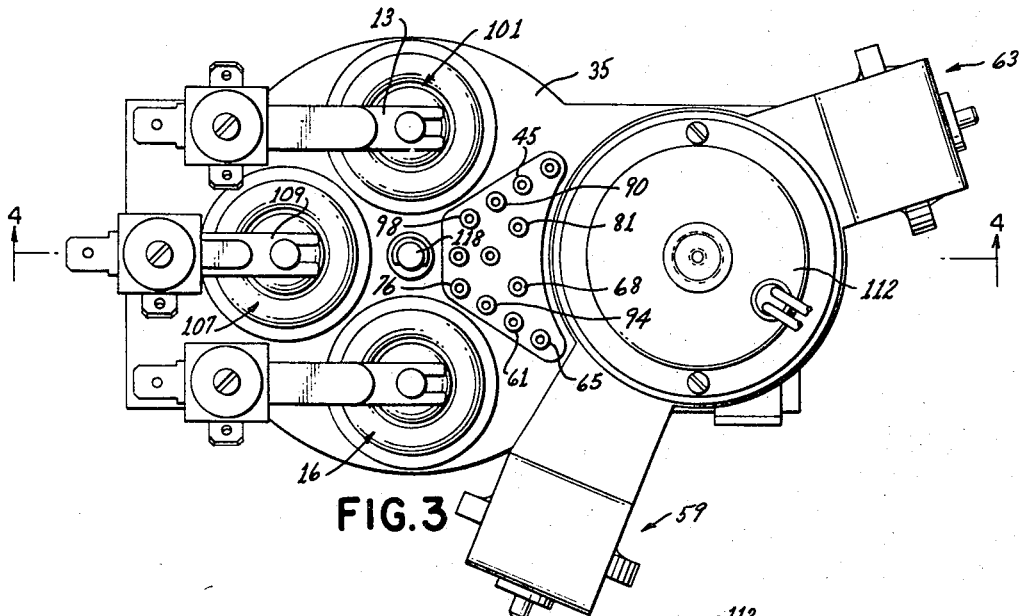
FIGURE 3 is a top view of the improved programming means of this invention.
Figure 4:
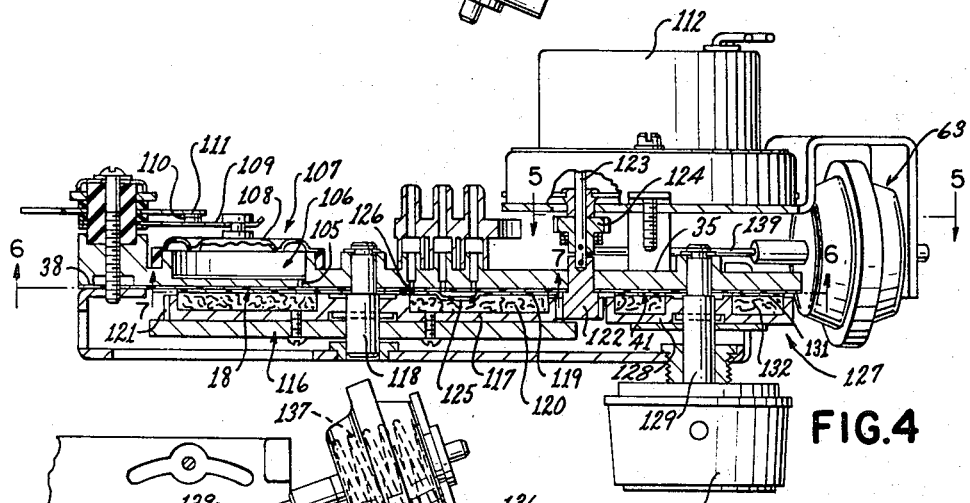
FIGURE 4 is a cross-sectional view of the programming means of FIGURE 3 and is taken on line 4—4 thereof.
Figure 6:
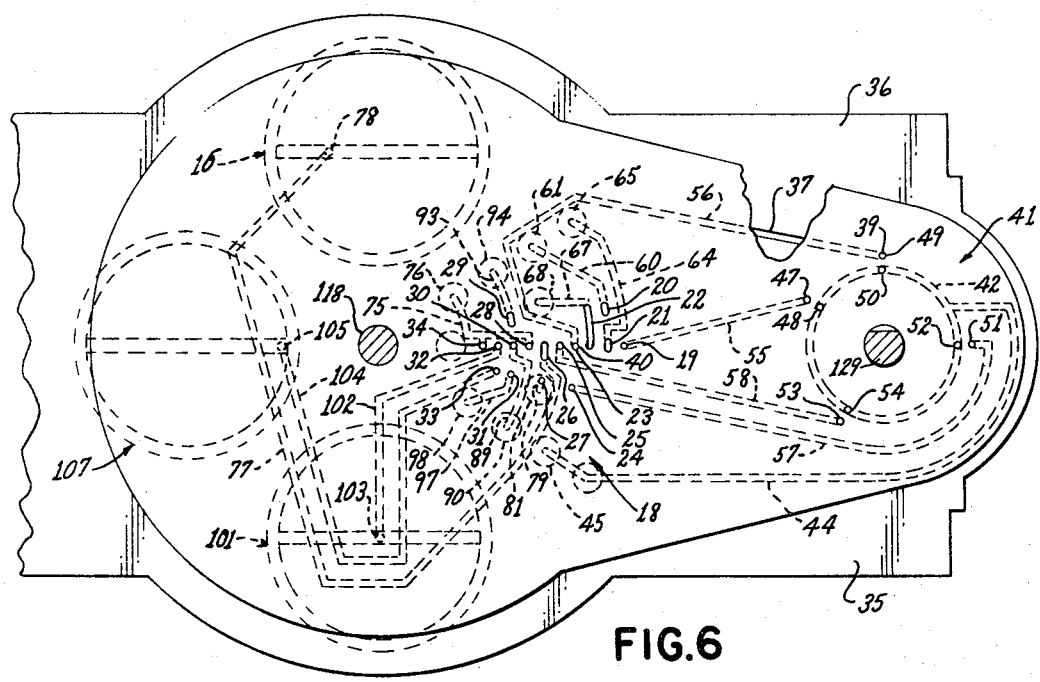
FIGURE 6 is an enlarged, fragmentary, cross-sectional view taken substantially on the line 6—6 of FIGURE 4 and illustrates the reading heads for the main program member and the selector valve member.

The reading head 17 illustrated in FIGURE 1 is an integral part of a plate member 35 illustrated in FIGURES 3, 4 and 6. The plate 35 has the surface 36 thereof provided with a plurality of grooves 37 leading from various parts of the surface 36.

For example, the groove 37 leads from a point 39 on the plate 35 to a point 40.

After all of the grooves have been formed in the surface 36 of the plate 35, a self-sealing tape member 38 or the like is superimposed on the surface 36 of the plate 35 to cover the grooves 37. However, the tape member 38 has openings passing therethrough and aligned with the grooves 37 in such a manner that the openings in the tape-like member 38 define the ports 19-34 previously described whereby the surface of the tape 38 in the region of the ports 19-34 provides the reading surface 18 previously described.

The tape 38 cooperates with the plate 35 to define another reading surface 41 as illustrated in FIGURES 6 and 1 and is defined by a circular groove 42 interconnected to the inlet of a vacuum pump 43 by groove means 44 interconnected to a nipple 45 carried by the plate 35 and interconnected to the pump fluid by flexible conduit means 46.

The tape 38 defines a plurality of ports 47, 48, 49, 50, 51, 52, 53 and 54 with the ports 48, 50, 52 and 54 each being in fluid communication with the vacuum source groove 42 for a purpose hereinafter described.

The port 47 of the reading head 41 is interconnected to the port 19 of the reading surface 18 by the groove 55. The port 49 of the reading surface 41 is interconnected to the port 23 of the reading surface 18 by a groove 56. The port 51 of the reading surface 41 is interconnected to the port 24 by a groove 57. The port 53 of the reading surface 41 is interconnected to the port 25 of the reading surface 18 by a groove 58.

The port 20 of the reading surface 18 is interconnected to a vacuum operated actuator 59 by groove means 60, nipple means 61 and flexible conduit means 62. The port 21 of the reading surface 18 is interconnected to a vacuum operated actuator 63 by groove means 64, nipple 65 and flexible conduit means 66.

The port 22 of the reading surface 18 is interconnected by groove means 67, nipple means 68 and flexible conduit means 70 to a vacuum operated actuator 71 which when in an atmospheric condition causes a valve member 72 to interconnect the flexible conduit 73 to a flexible conduit 74. However, when the actuator 71 is evacuated, the valve member 72 is moved to the dotted line position illustrated in FIGURE 1 to prevent communication between the conduits 73 and 74, the conduit 74 leading to the vacuum source conduit 46 while the conduit 73 is interconnected to the ports 28 and 34 of the reading surface 18 by groove means 75 and nipple means 76.

Port 26 of the reading surface 18 is interconnected to the vacuum operated actuators 16 by means of groove 77 leading to a port 78 passing through the plate 35 and being interconnected to the chamber of the actuator 16 mounted thereon as illustrated in FIGURE 3.

The port 27 of the reading surface 18 is interconnected by groove means 79, nipple means 81 and flexible conduit means 82 to a chamber of a vacuum operated actuator 83, the actuator 83 being interconnected to a flexible switch blade 84 placed in the line L₁.

The switch blade 84 is adapted to bridge the switch contacts 85 and 86 when the lid handle 87 of the dishwasher is rotated in a clockwise direction to start the operation of the dishwasher. However, when the actuator 83 is evacuated in the manner hereinafter described, the blade 84 is pulled further downwardly to the dotted line position illustrated in FIGURE 1 whereby the lid handle returns to its off position but the contacts 85 and 86 are still bridged by the blade 84 because of the evacuated actuator 83. Subsequently, when the actuator 83 is returned to atmospheric conditions, the switch blade 84 can be moved to the open position to turn off the system 10 in a manner hereinafter described.

The port 30 of the reading surface 18 is interconnected to a vacuum operated actuator 88 by groove means 89, nipple means 90 and flexible conduit means 91, the actuator 88 being adapted when evacuated to operate a water fill valve 92 for the dishwasher and, when returned to atmospheric conditions, to close the valve 92.

The port 29 of the reading surface 18 is interconnected by groove means 93, nipple means 94 and flexible conduit means 95 to a vacuum operated actuator 96 which controls the dispensing of the detergent into the dishwasher when the actuator 96 is evacuated.

The port 31 of the reading surface 18 is interconnected by groove means 97, a nipple means 98 and flexible conduit means 99 to a vacuum operated actuator 100 which is adapted to dispense a wetting agent into the dishwasher when the actuator 100 is evacuated.

The port 32 of the reading surface 18 is interconnected to a vacuum operated actuator 101 by groove means 102 leading to a port 103 in the plate 35 and interconnected to the chamber of a vacuum operated actuator 101 mounted on the plate 35 in the manner illustrated in FIGURE 3. The actuator 101 is interconnected to the switch blade 13 to bridge the contacts 14 and 15 when the actuator 101 is evacuated and to return the switch blade 13 to the position illustrated in FIGURE 1 when the chamber of the actuator 101 is returned to atmospheric conditions.

The port 33 in reading surface 18 is interconnected by groove means 104 to a port 105 in the plate 35 to be interconnected to the chamber 106 of a vacuum operated actuator 107 in the manner illustrated in FIGURE 4. The actuator 107 includes a flexible diaphragm 108 interconnected to a switch blade 109 normally holding contacts 110 and 111 in contact with each other. However, when the chamber 106 of the actuator 107 is evacuated, the diaphragm 108 is pulled downwardly to break electrical contact between the contacts 110 and 111 until atmospheric conditions again exist in the chamber 106.

The contacts 110 and 111 when bridged by the switch blade 109 places a timer motor 112 across the leads $L_1$ and $L_2$ for a purpose hereinafter described.

In addition, the timer motor 112 is adapted to be placed across the leads $L_1$ and $L_2$ by a thermostatically controlled normally open switch blade 113 which will bridge contacts 114 and 115 when the thermostat senses a certain temperature in the dishwasher whereby the timer motor 112 will be placed across the leads $L_1$ and $L_2$ even if the switch blade 109 is opened at this time.

A program means 116 is adapted to be rotated relative to the reading surface 18 and comprises a rigid backing plate 117 rotatably mounted to the plate 35 by shaft means 118, the plate means 117 being interconnected to a flexible reading sheet 119 and being spaced therefrom by a porous resilient material 120.

The backing member 117 has an annular ring gear means 121 disposed in meshing relation with a pinion gear means 122 rotatably mounted to the plate 35 and being interconnected to a shaft 123. The shaft 123 is interconnected by means of a one-way clutch to the output shaft of the timer motor 112 carried by the plate 35.

The shaft 123 also carries a pinion gear 124 fixed thereto whereby the pinion gear 124 can rotate the pinion gear 122 at a rate faster than the motor 112 for a purpose hereinafter described because the motor 112 is interconnected to the shaft 123 by a one-way clutch which permits such overriding movement of the pinion 124 for a purpose hereinafter described.

The reading sheet 119 of the program means 116 has a plurality of open-ended channels or blisters 125 formed therein in the pattern illustrated in FIGURE 7 and also has a plurality of aperture means 126 passing therethrough, the aperture means 126 either comprising small holes or elongated channels interrupted by a hole for a purpose hereinafter described.

Figure 7:
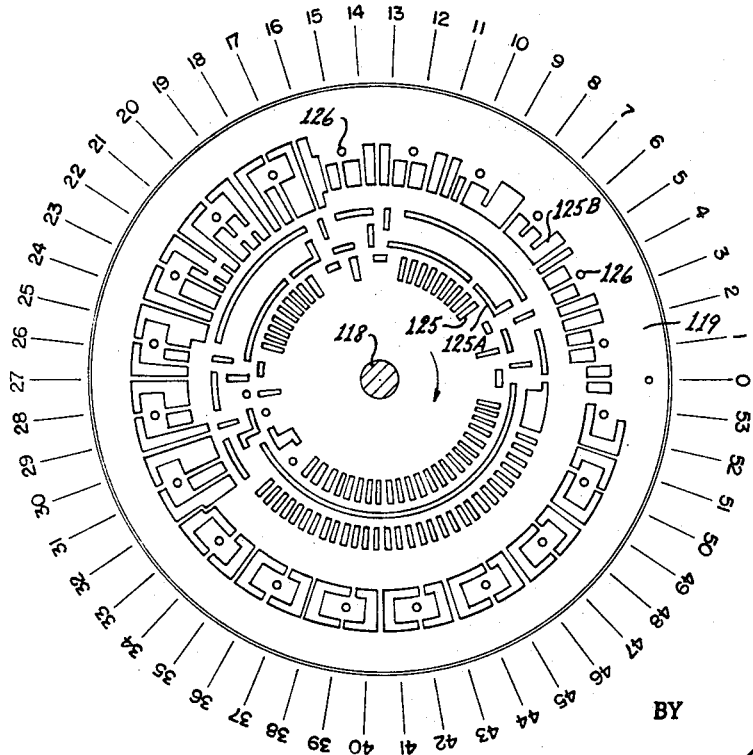
FIGURE 7 is a fragmentary, cross-sectional view taken substantially on line 7—7 of FIGURE 4 and illustrates the blister arrangement on the program tape for the main program member.

The reading sheet 119 illustrated in FIGURE 7 is adapted to be superimposed on the reading surface 18 illustrated in FIGURE 6 with the reading sheet 119 being rotatable in a clockwise direction to perform the sequence of the operation of the system 10 in a manner hereinafter described. However, in viewing FIGURE 1, the reading sheet moves relative to the reading surface 18 from right to left as fully illustrated in FIGURE 2 to produce the functions hereinafter described.

As illustrated in FIGURES 1 and 4, another program member 127 is provided and comprises a backup member 128 rotatably mounted to the plate 35 by shaft means 129 manually rotated by a selector knob 130. The backup member 128 is interconnected to a reading sheet 131 and is separated therefrom by a porous resilient material 132, the reading sheet 131 having a plurality of open-ended blisters 133 in the manner illustrated in FIGURE 1.

The selector knob 130 has an indicator 134' which is adapted to be disposed in the positions marked with D, N, H, S, P and C in FIGURE 1.

When the selector knob 130 is disposed in the position H, the blisters 133 thereof do not interconnect together any of the ports of the reading surface 41. When the selector knob 130 is disposed in the position N, the port 51 is interconnected to the port 52. When the knob 130 is disposed in the position S, the ports 53 and 54 are interconnected together by a blister 133. When the knob 130 is disposed in the position P, the ports 47 and 48 are interconnected together by a blister 133.

When the knob 130 is disposed in the position C, the ports 47 and 48 are interconnected by a blister 133 and the ports 49 and 50 are interconnected together by a blister 133. When the knob 130 is disposed in the position D, the ports 49 and 50 are interconnected together by a blister 133.

As illustrated in FIGURE 7, some of the blisters 125 of the reading sheet 119 are long and narrow for only bridging vertically aligned ports in the reading surface 18 while other of the blisters 125 are dog-legged or angled to at certain times interconnect some of the vertical ports with some of the horizontally disposed ports in the reading head 18 for a purpose hereinafter described. Further, certain of the blisters 125 in the reading sheet 119 comprise a plurality of narrow vertical blisters interconnected together by a wide horizontal blister superimposed therein to perform functions in a manner hereinafter described.

Figure 5:
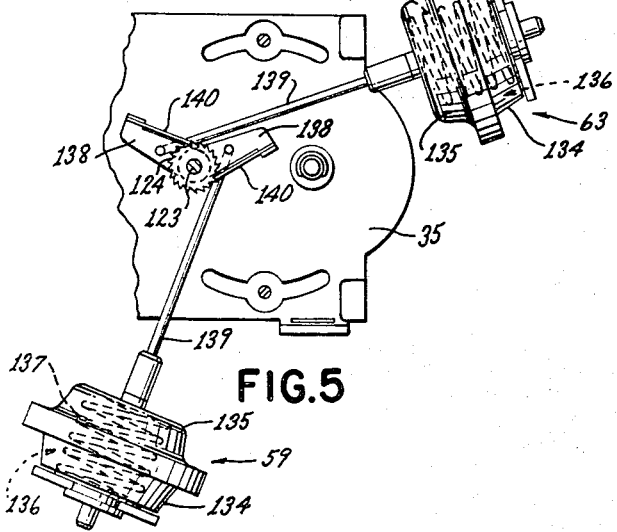
FIGURE 5 is a fragmentary, cross-sectional view taken on line 5—5 of FIGURE 4.

As illustrated in FIGURE 5, each actuator 59 and 63 comprises a fixed cup-shaped member 134 carried by the plate 35 cooperating with a flexible diaphragm 135 to define a chamber 136 therebetween, the flexible diaphragm 135 being urged to its "out" position as illustrated in FIGURE 5 by a compression spring 137 disposed in the chamber 136.

Each diaphragm 135 is interconnected to a link 138 rotatably mounted on the shaft 123 by a connecting rod 139. Each link 138 carries a ratchet or pawl finger 140 adapted to mesh with the teeth on the pinion gear 124 and rotate the pinion gear 124 in a program member advancing direction when the particular actuator 59 or 63 is evacuated. However when that evacuated actuator returns to atmospheric condition, the respective pawl 140 thereof moves back to a position to perform a new bite when that particular actuator is again evacuated.

The blisters 125 on the reading sheet 119 are so constructed and arranged that when the selector knob 130 determines when the actuators 59 and 63 are to be operated, the actuators 59 and 63 operate in an alternate manner by having the vacuum interconnected to one of the actuators 59 and 63 while an aperature means in the program sheet 119 interconnects the atmosphere to the other actuator so that the actuators 59 and 63 operate in an alternate manner to rapidly advance the program member 116 relative to the reading surface 18 at a speed faster than the timer motor 112 to eliminate various functions in a manner hereinafter described.

The operation of the system 10 and the various features of this invention will now be described.

The operator of the dishwasher 10 grasps the knob 130 and selects the desired performance for the dishwasher 10. For example, if the operator moves the selector knob 130 to select the H position thereof for a heavy wash, it can be seen that no ports of the reading surface 41 are interconnected together by the blisters 133 of the program tape 131 whereby the dishwasher will accomplish the complete cycle set forth in FIGURE 2.

Thereafter, the operator rotates the lid handle 87 in a clockwise direction as illustrated in FIGURE 1 to cause the switch blade 84 to bridge the contacts 85 and 86 to not only place the vacuum pump 43 across the leads $L_1$ and $L_2$ but also the timer motor 112.

Figure 2:
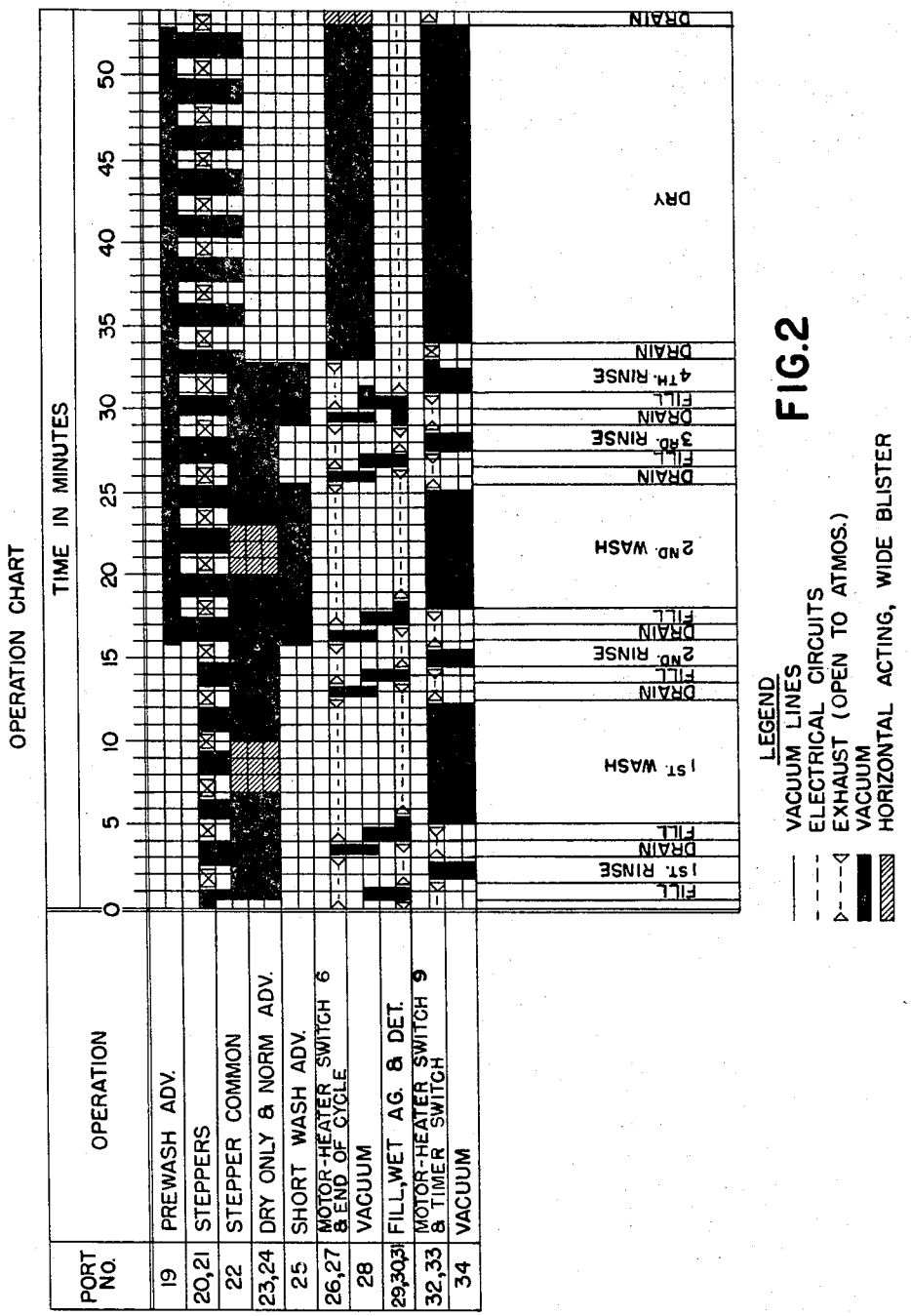
FIGURE 2 is a flow diagram illustrating the sequence of operation of the system illustrated in FIGURE 1.

Since the program sheet 119 is disposed at the 0 position illustrated in FIGURE 7 and will rotate in a clockwise direction upon the operation of the timer motor 112, it can be seen from FIGURE 2 that the blisters 125 of the program sheet 119 alternately interconnect the ports 23 and 24 to the ports 20 and 21 while alternately interconnecting the atmosphere to the ports 21 and 20 by aperture means thereof of so that the stepper actuators would rapidly advance the program means 116 if a vacuum source is interconnected to the port 23 by the selector knob 130 being disposed in the D position thereof for drying only or if a vacuum source is interconnected to the port 24 by the selector knob 130 being disposed in the N position thereof for normal operation only.

At the half-minute increment of movement of the program sheet 119, blister means interconnect together the port 28 to the port 30 whereby the inlet of the vacuum pump 43 is interconnected to the actuator 88 to cause the actuator 88 to open the water valve 92 and direct water into the dishwasher for approximately a one-minute increment.

After the minute and a half interval as illustrated in FIGURE 2, aperture means 126 in the program member 119 interconnects the atmosphere to the port 30 to permit the water valve 92 to close. However, other blister means interconnect the ports 32 and 34 together whereby the vacuum pump 43 is interconnected to the actuator 101 to cause the switch blade 13 to bridge the contacts 14 and 15 and permit the motor 11 to operate the impeller of the dishwasher to cause a first rinsing operation for an interval of approximately one minute. Thereafter, aperture means of the program member 119 return the actuator 101 to atmospheric condition so that the blade 13 moves to the position illustrated in full lines in FIGURE 1.

Simultaneously, other blister means of the program member 119 interconnect the ports 28 and 26 together so that the inlet of the vacuum pump 43 is interconnected to the actuator 16 to cause the same to pull the switch 12 in its down position to cause the motor 11 to operate the drain pump to drain the water from the dishwasher.

As illustrated in FIGURE 7, an L-shaped blister 125A moves across the reading surface 18 to not only bridge the vertically aligned ports 28 and 30 but also the horizontally aligned port 29 so that vacuum source 43 is interconnected to the actuator 38 and the actuator 96 so that when the water valve 92 is opened, the actuator 96 dispenses detergent into the dishwasher in preparation for the first wash thereof.

Thus, it can be seen that the dog-legged blisters in the program member 119 are adapted to not only interconnect together the vertically aligned ports of the reading head 17 but also certain of the horizontally aligned ports with certain of the vertically aligned ports to perform the two functions as previously described.

Thus, it can be seen that when the selector knob 130 is disposed in the H position thereof for heavy washing operation, the entire cycle of operation illustrated in FIGURE 2 is accomplished without having the stepper actuators 59 and 63 operated as no vacuum is interconnected to the ports 23 and 24 by the selector program member 131.

However, if a vacuum would be interconnected to one of the ports 23 or 24 or to both, it can be seen that the blister arrangement on the program member 119 would be to alternately interconnect the vacuum source to the steppers 59 and 63 to rapidly advance the program member 119 throughout the desired distance thereof in an overriding manner over the motor 112 to eliminate functions as set forth in FIGURE 2.

During the rapid advance of the program member 116, it can be seen that the blister means which interconnects the ports 23 or 24 to the ports 20 and 21 would also interconnect with the port 22 whereby the vacuum source would operate the actuator 71 and move the valve 72 to the dotted line position so that the vacuum pump 43 would not be interconnected to the ports 28 and 34 so that no operation would take place as blister means interconnect the ports 28 and 34 to other ports during the rapid advance of the program means 116.

As fully illustrated in FIGURE 7, it can be seen that certain of the blisters 125 comprise dog legs and the like wherein the same are substantially L-shaped, C-shaped, E-shaped and the like. Further, it can be seen that certain of the blisters of the reading sheet 119 include a plurality of narrow, vertical, spaced blisters interconnected together by a wide horizontal blister superimposed thereon. For example, see blister 125B wherein three vertical, spaced, narrow blisters are interconnected together by a wide horizontal blister superimposed thereon to define a substantially E-shaped blister 125B.

By forming the blisters in the irregular shapes as illustrated in FIG. 7, the program means of this invention can be made relatively small.

For example, dog-legged blisters, such as 125A, can have the vertical portion thereof to control repetitive, accurately timed operations while the horizontal portion is used for one-time operations such as for dispensers.

The wide blister superimposed on the narrow blisters, such as blister 125B, permit the narrow blisters to interconnect together vertically aligned ports while the wide superimposed blister thereof connects together angularly disposed ports whereby one channel of the reading head 17 can send two signals.

Further, by offsetting certain of the ports of the reading head in horizontal alignment, one blister and exhaust port on the program tape 119 can be utilized for alternate ports in horizontal alignment.

By combining vacuum inputs at the selector valve of this invention, various program combinations can be created. For example, ports 47 and 49 of the reading head 41 separately provide "pre-wash" and "dry" only rapid advance signals to the steppers 59 and 63. However, when combined by the control knob 130 being disposed in the "cancel" position thereof, they permit the rapid advance step actuators 59 and 63 to completely rapidly advance the program member to its off position regardless of the position of the program means 116.

The rapid advance stepping actuators 59 and 63 can omit functions normally operated by the reading sheet 119. For example, when port 53 of the reading head 41 is interconnected to the port 54, the second wash and rinse operation as illustrated in FIGURE 2 are omitted and at the increment 31 on the program member as illustrated in FIGURE 7 the thermal delay provided by the timer switch port 33 to the actuator 107 is by-passed by the rapid advance action of the steppers 59 and 63.

While grooving has been disclosed as a means for interconnecting together various ports on the reading head surface, it is to be understood that dog-legged blisters in the reading sheet 119 can be utilized for such purposes whereby the face tape 38 could be eliminated.

By mounting the various switching actuators, contacts and blades on the program plate 35 in the manner illustrated in FIGURES 3 and 4, it can be seen that a plurality of functions can be accomplished in a minimum of space which would normally be required just for the program means itself.

Therefore, it can be seen that an improved programming means and parts thereof have been provided by this invention.

While the form of the invention now preferred has been disclosed as required by the statutes, other forms may be used, all coming within the scope of the claims which follow.

What is claimed is:
1. In combination, a plurality of pneumatically operated actuator means, a pneumtaic source, a movable program member for controlling the sequential operation of said actuator means by interconnecting said source to said actuator means, a timer motor for moving said program member at a particular rate, and a pair of pneumatically operated overriding actuators for alternately moving said program member at a rate faster than the rate of said timer motor, said program member having means for directing said source to one of said overriding actuators while interconnecting the atmosphere to the other of said overriding actuators in an alternating manner.

2. A combination as set forth in claim 1 wherein a selector valve means is disposed between said source and said program member to determine when said program member is to alternately interconnect said source to said overriding actuators.

3. A combination as set forth in claim 2 wherein said selector valve means is remote from said program member.

4. A combination as set forth in claim 1 wherein said program member has a ring gear means and said timer motor is interconnected to a pinion gear means disposed in meshing relation with said ring gear means.

5. A combination as set forth in claim 4 wherein each overriding actuator includes a pawl member cooperable with said pinion gear means.

6. A combination as set forth in claim 5 wherein each overriding actuator includes a housing means and flexible diaphragm defining a chamber with said housing means, said diaphragm being interconnected to its respective pawl member to cause rotation of said pinion gear means when said chamber is evacuated and to move said pawl to a new bite position when said chamber is returning to atmospheric condition.

References Cited

UNITED STATES PATENTS

| | | | |
|---|---|---|---|
| 2,846,047 | 8/1958 | Neighbor et al. | 74—129 X |
| 2,947,187 | 8/1960 | Graff et al. | 74—129 X |
| 3,216,326 | 11/1965 | Rice et al. | 91—36 |
| 3,255,672 | 6/1966 | Wantz et al. | 91—36 |
| 2,980,076 | 4/1961 | Machlan et al. | 91—39 |

MARTIN P. SCHWADRON, *Primary Examiner.*

G. N. BAUM, *Assistant Examiner.*

U.S. Cl. X.R.

74—129; 137—625.18; 91—39, 37